(12) United States Patent
Kawai et al.

(10) Patent No.: US 8,426,027 B2
(45) Date of Patent: Apr. 23, 2013

(54) COMPOSITION FOR COATING PLASTIC SUBSTRATE, COATING FILM FORMED THEREFROM, AND FORMED BODY

(75) Inventors: Kenji Kawai, Koga (JP); Shuhei Kawabata, Saitama (JP)

(73) Assignee: Fujikura Kasei Co., Ltd., Tokyo (JP)

( * ) Notice: Subject to any disclaimer, the term of this patent is extended or adjusted under 35 U.S.C. 154(b) by 206 days.

(21) Appl. No.: 12/934,184

(22) PCT Filed: Mar. 19, 2009

(86) PCT No.: PCT/JP2009/055418
§ 371 (c)(1),
(2), (4) Date: Sep. 23, 2010

(87) PCT Pub. No.: WO2009/119436
PCT Pub. Date: Oct. 1, 2009

(65) Prior Publication Data
US 2011/0014477 A1 Jan. 20, 2011

(30) Foreign Application Priority Data
Mar. 27, 2008 (JP) ................................ 2008-082284

(51) Int. Cl.
*B32B 27/40* (2006.01)
*C08K 5/29* (2006.01)
*C08F 2/48* (2006.01)

(52) U.S. Cl.
USPC .......................... 428/423.1; 524/196; 522/78

(58) Field of Classification Search ............... 428/423.1; 524/196; 522/78
See application file for complete search history.

(56) References Cited

U.S. PATENT DOCUMENTS 5,378,735 A * 1/1995 Hosokawa et al. .......... 522/79
2002/0197475 A1 12/2002 Edelmann et al.
2003/0216497 A1 11/2003 Nakagawa et al.
2006/0166140 A1 7/2006 Fujimoto et al.
2008/0153937 A1 6/2008 Oguni et al.

FOREIGN PATENT DOCUMENTS

| EP | 1 375 614 | 1/2004 |
|---|---|---|
| JP | 02-173163 | 7/1990 |
| JP | 07-109355 | 4/1995 |
| JP | 2002-245672 | 8/2002 |
| JP | 2002-256220 | 9/2002 |
| JP | 2002-285083 | 10/2002 |
| JP | 2003-041148 | 2/2003 |
| JP | 2003-311891 | 11/2003 |
| JP | 2006-052270 | 2/2006 |
| JP | 2006-063244 | 3/2006 |
| JP | 2006-241234 | 9/2006 |
| JP | 2007-016215 | 1/2007 |
| JP | 2007-261253 | 10/2007 |
| JP | 2008-150484 | 7/2008 |

OTHER PUBLICATIONS

Japanese Patent Office; Search Report and Written Opinion in International Patent Application No. PCT/JP2009/055418 dated Jun. 23, 2009.
Extended European Search Report issued in European Patent Application No. 09725744.8, dated Aug. 22, 2011.

* cited by examiner

*Primary Examiner* — Thao T. Tran
(74) *Attorney, Agent, or Firm* — Wood, Herron & Evans, L.L.P.

(57) ABSTRACT

The present invention relates to a composition for coating a plastic substrate, a coating film formed therefrom and a molded body. The composition can form a coating film that exhibits favorable adhesion to plastic substrates, as well as excellent abrasion resistance and weather resistance. The coating film-forming components of the composition include silica particles having (meth)acryloyl groups, a hexafunctional or higher aliphatic urethane(meth)acrylate, and an active energy beam-curable compound having an alicyclic structure, wherein the amount of the silica particles is within a range from 1.0 to 40 mass %, relative to 100 mass % of the coating film-forming components.

8 Claims, No Drawings

COMPOSITION FOR COATING PLASTIC SUBSTRATE, COATING FILM FORMED THEREFROM, AND FORMED BODY

TECHNICAL FIELD

The present invention relates to a composition for coating a plastic substrate, a coating film formed from such a coating composition, and a formed body composed of a plastic substrate and a coating film.

Priority is claimed on Japanese Patent Application No. 2008-082284, filed Mar. 27, 2008, the content of which is incorporated herein by reference.

BACKGROUND ART

Plastic products made from plastic materials are widely used in diverse fields such as the automotive field, shipbuilding and construction, as decorative materials, substitute materials for inorganic glass, all manner of optical materials including mirrors and lenses, and various display materials.

The surfaces of these plastic materials are usually prone to scratching, and therefore in a known technique, a thermosetting resin or photocurable resin or the like is typically coated onto a substrate composed of the plastic material, thereby forming a hard coating on the substrate surface.

However, even better scratch resistance (abrasion resistance) is being demanded of plastic products, and the level of abrasion resistance achievable by the type of hard coating treatment mentioned above has tended to be unsatisfactory.

As a result, Patent Document 1 discloses, as a material for a curable composition capable of forming a transparent coating that exhibits excellent abrasion resistance and curability, a coating composition including silica particles having (meth)acryloyl groups and a compound having a functional group that undergoes polymerization with these silica particles.

Further, Patent Document 2 discloses, as a material capable of forming a crosslinked cured film that exhibits favorable abrasion resistance and weather resistance and the like, as well as superior adhesion to substrates, a coating composition including a coating material obtained by reacting a colloidal silica with a radical polymerizable silane compound.

[Patent Document 1]
Japanese Unexamined Patent Application, First Publication No. 2003-41148
[Patent Document 2]
Japanese Unexamined Patent Application, First Publication No. Hei 7-109355

DISCLOSURE OF INVENTION

Problems to be Solved by the Invention

However, the compositions disclosed in Patent Documents 1 and 2 do not exhibit entirely satisfactory levels of abrasion resistance.

Furthermore, coating compositions also require excellent adhesion to plastic substrates and excellent weather resistance, but the levels of adhesion and weather resistance provided by the compositions disclosed in Patent Documents 1 and 2 are not entirely satisfactory.

The present invention takes the above circumstances into consideration, with an object of providing a composition for coating a plastic substrate that is capable of forming a coating film that exhibits favorable adhesion to plastic substrates, as well as excellent abrasion resistance and weather resistance.

Means to Solve the Problems

In order to achieve the above object, the present invention adopts the aspects described below.

(1) A composition for coating a plastic substrate according to the present invention includes, as coating film-forming components, silica particles having (meth)acryloyl groups, a hexafunctional or higher aliphatic urethane(meth)acrylate, and an active energy beam-curable compound having an alicyclic structure, wherein the amount of the silica particles is within a range from 1.0 to 40 mass %, relative to 100 mass % of the coating film-forming components.

(2) The composition for coating a plastic substrate disclosed in (1) above, wherein the amount of the aliphatic urethane (meth)acrylate is preferably within a range from 10 to 60 mass %, relative to 100 mass % of the coating film-forming components.

(3) The composition for coating a plastic substrate disclosed in (1) above, wherein the amount of the active energy beam-curable compound is preferably within a range from 5 to 60 mass %, relative to 100 mass % of the coating film-forming components.

(4) The composition for coating a plastic substrate disclosed in (1) above, preferably also including 1 to 20 parts by mass of a photopolymerization initiator relative to 100 parts by mass of the coating film-forming components.

(5) Further, the present invention also provides a coating film formed from the composition for coating a plastic substrate according to any one of (1) to (4) above.

(6) Furthermore, the present invention also provides a formed body including a plastic substrate and a coating film according to (5) above coated thereon.

Effect of the Invention

The composition for coating a plastic substrate according to the present invention is capable of forming a coating film that exhibits favorable adhesion to plastic substrates, as well as excellent abrasion resistance and weather resistance, whereas a formed body that has been coated with such a coating film exhibits excellent abrasion resistance and weather resistance.

BEST MODE FOR CARRYING OUT THE INVENTION

A more detailed description of the present invention is presented below.

A composition for coating a plastic substrate according to the present invention (hereafter also referred to as simply "the coating composition") includes coating film-forming components.

These coating film-forming components include silica particles, an aliphatic urethane(meth)acrylate and an active energy beam-curable compound.

[Coating Film-Forming Components]
<Silica Particles>

The silica particles contain (meth)acryloyl groups.

These types of silica particles can be obtained, for example, by subjecting a compound having a (meth)acryloyl group and an alkoxysilane partial condensate to a dealcoholization condensation reaction.

In the following description of the present invention, the silica particles having (meth)acryloyl groups are referred to as "polymerizable silica particles".

Examples of the compound having a (meth)acryloyl group include hydroxyalkyl (meth)acrylates, ε-caprolactone condensates thereof, polyethylene glycol mono(meth)acrylate, and pentaerythritol tri(meth)acrylate.

Examples of the alkoxysilane partial condensate include materials obtained by adding water to an alkoxysilane compound in the presence of an acid or base catalyst, and partially hydrolyzing and condensing the alkoxysilane. Specific examples of the alkoxysilane compound include tetramethoxysilane, tetraethoxysilane, methyltrimethoxysilane, ethyltrimethoxysilane and ethyltriethoxysilane.

In the description of the present invention, the term "(meth) acryloyl group" refers to one or both of a methacryloyl group and an acryloyl group, whereas the term "(meth)acrylate" refers to one or both of a methacrylate and an acrylate.

Commercially available products may be used as the polymerizable silica particles, and products such as "BEAMSET HC-900" and "BEAMSET HC-910" manufactured by Arakawa Chemical Industries, Ltd., and "DESOLITE Z7501" and "DESOLITE Z7503" manufactured by JSR Corporation are ideal.

The average particle size of the polymerizable silica particles is preferably within a range from 5 to 600 nm, and is more preferably from 10 to 300 nm. An average particle size of 10 to 200 nm is even more desirable. Provided the average particle size is at least 5 nm, satisfactory abrasion resistance can be more readily achieved. On the other hand, provided the average particle size is not more than 600 nm, satisfactory transparency can be more readily achieved.

The average particle size of the polymerizable silica particles is determined as the volume median size.

The amount of the polymerizable silica particles, relative to 100 mass % of the coating film-forming components, is typically within a range from 1.0 to 40 mass %, preferably from 5.0 to 20 mass %, and more preferably from 10 to 15 mass %. Provided this amount is at least 1.0 mass %, a favorable level of abrasion resistance is achieved for the coating film formed from the coating composition. On the other hand, provided the amount is not more than 40 mass %, the adhesion of the coating film to plastic substrates can be improved.

<Aliphatic Urethane(Meth)Acrylate>

The aliphatic urethane(meth)acrylate has 6 or more functional groups.

Generally, if urethane(meth)acrylates other than aliphatic urethane(meth)acrylates are included within a coating composition, then the weather resistance of the coating film tends to deteriorate, and the coating film tends to become prone to yellowing. Accordingly, in order to maintain the weather resistance of the coating film, coating compositions frequently include an aliphatic urethane(meth)acrylate. However, in order to form a coating film with superior weather resistance, the coating composition preferably includes an aliphatic urethane(meth)acrylate having 5 or more functional groups. If this number of functional groups is 6 or greater, then not only is the weather resistance of the coating film excellent, but the crosslinking density also increases, meaning a coating film with excellent abrasion resistance can be formed.

Examples of this type of aliphatic urethane(meth)acrylate include reaction products of a polyisocyanate compound, a polyol and a (meth)acrylate having a hydroxyl group.

Examples of the polyisocyanate compound include hexamethylene diisocyanate, 2,2,4-trimethylhexamethylene diisocyanate, hexamethylene diisocyanate trimer, and aliphatic polyisocyanates thereof.

Examples of the polyol include ethylene glycol, diethylene glycol, propylene glycol, dipropylene glycol, 1,6-hexanediol, neopentyl glycol, trimethylolpropane and pentaerythritol.

Examples of the (meth)acrylate having a hydroxyl group include pentaerythritol tri(meth)acrylate, dipentaerythritol penta(meth)acrylate and dipentaerythritol tri(meth)acrylate.

By reacting the aforementioned polyisocyanate compound, polyol and (meth)acrylate having a hydroxyl group, a hexafunctional or higher aliphatic urethane (meth)acrylate is obtained. A conventional catalyst may be used in the reaction.

Further, commercially available materials may also be used as the aliphatic urethane(meth)acrylate, including the product "EBECRYL 1290K" (a urethane oligomer manufactured by Daicel-Cytec Co., Ltd.), and the products "SHIKOH 7610" and "SHIKOH 7620EA" (urethane oligomers manufactured by Nippon Synthetic Chemical Industry Co., Ltd.).

The amount of the aliphatic urethane(meth)acrylate, relative to 100 mass % of the coating film-forming components, is preferably within a range from 10 to 60 mass %, more preferably from 20 to 50 mass %, and still more preferably from 25 to 45 mass %. Provided this amount is at least 10 mass %, a coating film of superior abrasion resistance can be obtained. On the other hand, even if the amount is greater than 60 mass %, achieving an abrasion resistance that exceeds a certain level is difficult, and the production costs tend to increase. Provided the amount of the aliphatic urethane(meth) acrylate satisfies the above-mentioned range, a coating film with superior abrasion resistance can be obtained, while the production costs are kept to a minimum, and therefore the upper limit for this amount is preferably not more than 60 mass %.

<Active Energy Beam-Curable Compound>

The active energy beam-curable compound has an alicyclic structure. Active energy beam-curable compounds having an alicyclic structure are resistant to shrinkage upon curing, and exhibit particularly favorable adhesion to plastic materials. Accordingly, by including this type of active energy beam-curable compound within the coating composition, a coating film can be formed that exhibits excellent adhesion to plastic substrates.

The active energy beam-curable compound having an alicyclic structure may be either a monomer or an oligomer. Specific examples include cyclohexyl(meth)acrylate, t-butylcyclohexyl(meth)acrylate, dicyclohexylpentanyl(meth)acrylate, tricyclodecanedimethanol(meth)acrylate, isobornyl (meth)acrylate, dimethyloltricyclodecane di(meth)acrylate and dimethyloldicyclopentane di(meth)acrylate.

Further, as the active energy beam-curable compound having an alicyclic structure, urethane(meth)acrylates having an alicyclic structure obtained, for example, by reacting a polyisocyanate compound having an alicyclic structure with a polyol, and then reacting the resulting product with a (meth) acrylate having a hydroxyl group may also be used.

Examples of the polyisocyanate compound having an alicyclic structure include hydrogenated xylylene diisocyanate, hydrogenated diphenylmethane diisocyanate, isophorone diisocyanate, 1,3-bis(isocyanatomethyl)cyclohexane, isophorone diisocyanate trimer, and polyisocyanates having the above types of alicyclic structures.

Examples of the polyol include one or more compounds selected from the polyols listed above within the description of the aliphatic urethane(meth)acrylate.

Examples of the (meth)acrylate having a hydroxyl group include 2-hydroxyethyl(meth)acrylate, 2-hydroxypropyl (meth)acrylate, 2-hydroxybutyl(meth)acrylate, pentaerythritol tri(meth)acrylate, dipentaerythritol penta(meth)acrylate and dipentaerythritol tri(meth)acrylate.

The amount of the active energy beam-curable compound having an alicyclic structure, relative to 100 mass % of the coating film-fanning components, is preferably within a range from 5 to 60 mass %, more preferably from 10 to 50 mass %, and still more preferably from 15 to 40 mass %. Provided this amount is at least 5 mass %, a coating film with excellent adhesion, and particularly superior adhesion upon cold-hot temperature cycling, can be obtained. On the other hand, provided the amount is not more than 60 mass %, a coating film with satisfactory abrasion resistance can be obtained.

<Other>

The coating film-forming components may also include active energy beam-curable compounds other than the active energy beam-curable compound having an alicyclic structure described above.

Examples of these other active energy beam-curable compounds include compounds having one or more (meth)acryloyl groups within each molecule. Specific examples include methyl(meth)acrylate, ethyl(meth)acrylate, n-butyl(meth)acrylate, t-butyl(meth)acrylate, benzyl(meth)acrylate, ethoxyethyl(meth)acrylate, butoxyethyl(meth)acrylate, hydroxyethyl(meth)acrylate, cyclohexyl(meth)acrylate, t-butylcyclohexyl(meth)acrylate, dicyclohexylpentanyl (meth)acrylate, tricyclodecanedimethanol(meth)acrylate, isobornyl(meth)acrylate, ethylene glycol di(meth)acrylate, diethylene glycol di(meth)acrylate, triethylene glycol di(meth)acrylate, tetraethylene glycol di(meth)acrylate, 2-(meth)acryloyloxyethyl acid phosphate, 1,4-butanediol di(meth)acrylate, 1,6-hexanediol di(meth)acrylate, tris(2-hydroxyethyl) isocyanurate tri(meth)acrylate, dimethyloltricyclodecane di(meth)acrylate, neopentyl glycol di(meth)acrylate, 3-methyl-1,5-pentanediol di(meth)acrylate, 2-butyl-2-ethyl-1,3-propane di(meth)acrylate, propylene glycol di(meth)acrylate, dipropylene glycol di(meth)acrylate, trimethylolpropane tri(meth)acrylate, pentaerythritol tri(meth)acrylate, tris(2-hydroxyethyl) isocyanurate tri(meth)acrylate, dimethylolpropane tetra(meth)acrylate, pentaerythritol tetra (meth)acrylate, dipentaerythritol hexa(meth)acrylate and tris (acryloxyethyl) isocyanurate.

The amount of this other active energy beam-curable compound, relative to 100 mass % of the coating film-forming components, is preferably within a range from 5 to 50 mass %, more preferably from 10 to 40 mass %, and still more preferably from 15 to 35 mass %. Provided this amount is at least 5 mass %, the viscosity of the coating composition can be prevented from becoming excessively high, thus ensuring more favorable coating properties. On the other hand, provided the amount is not more than 50 mass %, favorable abrasion resistance and weather resistance properties can be retained.

Further, the coating film-forming components may also include silica particles other than the above polymerizable silica particles (namely, silica particles that do not have (meth)acryloyl groups) and thermoplastic resins and the like.

By including other silica particles, curing shrinkage upon curing of the coating composition can be suppressed, and the type of cracking that may occur, particularly when the coating film is thick, can be better suppressed. Examples of these other silica particles include commercially available products such as SNOWTEX 20, SNOWTEX 30, SNOWTEX 40, SNOWTEX UP and SNOWTEX OUP (all manufactured by Nissan Chemical Industries, Ltd.). These other silica particle products may be used either individually or in mixtures of two or more products.

In those cases where other silica particles are included, the average particle size of those particles is preferably within a range from 5 to 600 nm, more preferably from 10 to 300 nm, and still more preferably from 10 to 200 nm. If this average particle size is less than 5 nm, then a large amount of these other silica particles must be added to achieve the desired crack suppression effect, which tends to cause a deterioration in the adhesion. Provided the average particle size is at least 5 nm, a favorable balance can be maintained between crack suppression and adhesion. On the other hand, provided the average particle size is not more than 600 nm, satisfactory transparency tends to be more readily maintained.

The average particle size of the other silica particles is determined as the volume median size.

The other silica particles may be added in accordance with the intended application of the coating composition, and the amount of these other silica particles, relative to 100 mass % of the coating film-forming components, is preferably within a range from 0 to 20 mass %, more preferably from 1 to 10 mass %, and still more preferably from 2 to 8 mass %. The effects of the present invention can be obtained even without including other silica particles, although if the amount of other silica particles satisfies the above-mentioned range, then curing shrinkage upon curing of the coating composition can be suppressed, and the type of cracking that may occur, particularly when the coating film is thick, can be better suppressed.

Including a thermoplastic resin within the coating film-forming components tends to result in better fluidity for the coating composition. Examples of the thermoplastic resin include (meth)acrylate resins, including homopolymers such as poly(methyl methacrylate), poly(ethyl methacrylate), poly (butyl methacrylate) and poly(2-ethylhexyl methacrylate), and copolymers thereof. Of these resins, poly(methyl methacrylate) is preferred.

The thermoplastic resin may be added in accordance with the intended application of the coating composition, and the amount of the thermoplastic resin, relative to 100 mass % of the coating film-forming components, is preferably within a range from 0 to 30 mass %, more preferably from 0 to 20 mass %, and still more preferably from 0 to 15 mass %. The effects of the present invention can be obtained even without including the thermoplastic resin, although if the amount of the thermoplastic resin satisfies the above-mentioned range, then the fluidity of the coating composition can be further improved, while maintaining the various other properties of the formed coating film such as the adhesion, the abrasion resistance and the weather resistance.

In the coating film-forming components including each of the components described above, the average molecular weight between crosslinks is preferably within a range from 100 to 500, more preferably from 120 to 400, and still more preferably from 140 to 365. Provided the average molecular weight between crosslinks is at least 100, the coating film formed from the coating composition of the present invention can be prevented from becoming excessively hard, and the cured protective film becomes more resistant to peeling. On the other hand, ensuring that the average molecular weight between crosslinks is not more than 500 prevents the coating film formed from the coating composition from becoming overly soft, and inhibits cracking of the cured protective film.

In the present invention, the expression "average molecular weight between crosslinks" is the average of the molecular weight between crosslinks values for the various monomers that constitute the coating film-forming components other than the polymerizable silica particles and the other silica particles, wherein the molecular weight between crosslinks for each monomer is calculated as the average molecular weight of the monomer divided by the number of reactive functional groups within the monomer (in other words, the average molecular weight between crosslinks is calculated as the sum of each molecular weight between crosslinks value multiplied by the relative proportion of that monomer within the composition). For example, if the coating film-forming components include trimethylolpropane triacrylate (TMPTA), then because the average molecular weight of TMPTA is 296 and the number of reactive functional groups is 3, the molecular weight between crosslinks is 99. The reactive functional groups of TMPTA refer to the acryloyl groups (vinyl groups).

[Other Components]

The coating composition of the present invention preferably also includes a photopolymerization initiator and an ultraviolet absorber.

Examples of commercially available products that may be used as the photopolymerization initiator include IRGACURE 184, IRGACURE 149, IRGACURE 651, IRGACURE 907, IRGACURE 754, IRGACURE 819, IRGACURE 500, IRGACURE 1000, IRGACURE 1800 AND IRGACURE 754 (all manufactured by Ciba Specialty Chemicals Inc.), LUCIRIN TPO (manufactured by BASF Corporation), and KAYACURE DETX-S, KAYACURE EPA and KAYACURE DMBI (all manufactured by Nippon Kayaku Co., Ltd.). Any one of these photopolymerization initiators may be used individually, or two or more may be used in combination.

A photosensitizer and/or a photoaccelerator may be used in combination with the photopolymerization initiator.

The amount of the photopolymerization initiator is preferably within a range from 1 to 20 parts by mass, more preferably from 2 to 10 parts by mass, and still more preferably from 3 to 8 parts by mass, relative to 100 parts by mass of the coating film-forming components. Provided the amount of the photopolymerization initiator satisfies the above-mentioned range, a satisfactory crosslinking density can be achieved, and a coating film having superior abrasion resistance is obtained.

Examples of commercially available products that may be used as the ultraviolet absorber include TINUVIN 327, TINUVIN 328, TINUVIN 400, TINUVIN 479, TINUVIN 900 and TINUVIN 928 (all manufactured by Ciba Specialty Chemicals Inc.), and SEESORB 100, SEESORB 101, SEESORB 103 and SEESORB 151 (all manufactured by Shipro Kasei Kaisha, Ltd.). Any one of these ultraviolet absorbers may be used individually, or two or more may be used in combination.

The amount of the ultraviolet absorber is preferably within a range from 1 to 20 parts by mass, more preferably from 2 to 10 parts by mass, and still more preferably from 3 to 8 parts by mass, relative to 100 parts by mass of the coating film-forming components. Provided the amount of the ultraviolet absorber satisfies the above-mentioned range, a coating film having excellent weather resistance can be obtained, while maintaining favorable abrasion resistance.

If required, the coating composition may also include any of a variety of solvents. Examples of solvents that may be added include hydrocarbon-based solvents such as toluene, xylene, solvent naphtha, methylcyclohexane and ethylcyclohexane, ester-based solvents such as ethyl acetate, butyl acetate and ethylene glycol monomethyl ether acetate, and ketone-based solvents such as acetone, methyl ethyl ketone, methyl isobutyl ketone and diisobutyl ketone. Any one of these solvents may be used individually, or two or more may be used in combination.

Further, the coating composition may also include appropriate amounts of the types of additives typically added to coating materials, including antioxidants, radical scavengers, surface modifiers, plasticizers and pigment precipitation inhibitors.

The coating composition can be prepared by mixing the coating film-forming components, including the aforementioned polymerizable silica particles, the hexafunctional or higher aliphatic urethane(meth)acrylate, the active energy beam-curable compound having an alicyclic structure, and where necessary the other active energy beam-curable compound, other silica particles and thermoplastic resin, with any other components such as the photopolymerization initiator, solvent and additives.

A coating film can be formed by applying the coating composition prepared in the manner described above to the surface of a plastic substrate using a spray coating method, brush coating method, roller coating method, curtain coating method, flow coating method or dip coating method or the like, in an amount sufficient to yield a coating film thickness following curing of approximately 1 to 50 μm, and then irradiating the composition with ultraviolet radiation of approximately 100 to 3,000 mJ (as measured by a UVR-N1 device manufactured by Japan Storage Battery Co., Ltd.) for approximately 1 to 10 minutes using a fusion lamp, high-pressure mercury lamp or metal halide lamp or the like to complete formation of the coating film.

Besides ultraviolet radiation. an electron beam or gamma rays or the like may also be used as the active energy beam.

The coating composition of the present invention is ideal for coating plastic substrates.

Examples of the plastic material constituting the plastic substrate include polycarbonate resins, acrylic resins, acrylonitrile-butadiene-styrene resins (ABS resins), polyester resins and cycloolefin resins.

By applying the coating composition of the present invention to a surface of the above type of plastic substrate and forming a coating film, a composite coating film is obtained that exhibits favorable adhesion between the plastic substrate and the coating film, as well as excellent abrasion resistance and weather resistance. Further, a formed body produced by coating the surface of an aforementioned plastic substrate with a composite coating film of the present invention is also included within the present invention.

There are no particular limitations on the potential applications of the composite coating film and formed body produced in the manner described above, and potential applications are numerous, including construction materials such as aluminum sashes and components for vehicles such as automobiles.

The coating composition of the present invention described above includes specific polymerizable silica particles and an aliphatic urethane(meth)acrylate in specific amounts, and is therefore capable of forming a coating film that exhibits excellent abrasion resistance and weather resistance. Moreover, by also including a specific active energy beam-curable compound, the coating composition is able to form a coating film that exhibits excellent adhesion to plastic substrates.

Further, the present invention also enables the formation of a composite coating film that exhibits favorable adhesion between the plastic substrate and the coating film and also exhibits excellent abrasion resistance and weather resistance, as well as a formed body having excellent abrasion resistance and weather resistance that is formed from a plastic substrate and a composite coating film coated onto the surface thereof.

Moreover, because the coating composition has active energy beam-curable properties, the time required for curing the composition is shorter than that required for heat-curable coating materials, resulting in improved productivity.

EXAMPLES

The present invention is described in further detail below based on a series of examples and comparative examples, although the present invention is in no way limited by these examples.

Details relating to the various components used in the examples and comparative examples are presented below.

[Coating Film-Forming Components]

<Silica Particles Having (Meth)Acryloyl Groups>
(1) Polymerizable silica particles: BEAMSET HC-900, manufactured by Arakawa Chemical Industries, Ltd., average particle size: 25 nm.

<Aliphatic Urethane(Meth)Acrylate>
(2) Nonafunctional oligomer: SHIKOH 7610, manufactured by Nippon Synthetic Chemical Industry Co., Ltd., average molecular weight: 4,000, number of reactive functional groups: 9, molecular weight between crosslinks: 444.
(3) Hexafunctional oligomer: EBECRYL 1290K, manufactured by Daicel-Cytec Co., Ltd., average molecular weight: 1,000, number of reactive functional groups: 6, molecular weight between crosslinks: 167.
(4) Tetrafunctional oligomer: EBECRYL 8210, manufactured by Daicel-Cytec Co., Ltd., average molecular weight: 600, number of reactive functional groups: 4, molecular weight between crosslinks: 150.
(5) Difunctional oligomer: SHIKOH 3520, manufactured by Nippon Synthetic Chemical Industry Co., Ltd., average molecular weight: 14,000, number of reactive functional groups: 2, molecular weight between crosslinks: 7,000.

<Aromatic Urethane(Meth)Acrylate>
(6) Hexafunctional oligomer: EBECRYL 220, manufactured by Daicel-Cytec Co., Ltd., average molecular weight: 1,000, number of reactive functional groups: 6, molecular weight between crosslinks: 167.

<Active Energy Beam-Curable Compound>
(7) Alicyclic oligomer (difunctional): prepared using the method described below.

A 500 ml flask fitted with a stirrer and a thermometer was charged with 59 parts by mass of 1,6-hexanediol (manufactured by Ube Industries, Ltd.) and 194 parts by mass of hydrogenated xylylene diisocyanate (manufactured by Mitsui Takeda Chemicals, Inc.), and the resulting mixture was reacted under a stream of nitrogen for 4 hours at 70° C. Subsequently, 116 parts by mass of 2-hydroxyethyl acrylate (manufactured by Kyoeisha Chemical Co., Ltd.), 0.6 parts by mass of hydroquinone and 0.3 parts by mass of dibutyltin dilaurate were added to the flask, and with nitrogen being bubbled through the flask contents, a reaction was conducted for 5 hours at 70° C., yielding a difunctional alicyclic urethane acrylate. The average molecular weight of the thus obtained difunctional alicyclic urethane acrylate was 738, the number of reactive functional groups was 2, and the molecular weight between crosslinks was 369.

(8) Alicyclic monomer (difunctional): ARONIX M203, manufactured by Toagosei Co., Ltd., average molecular weight: 304, number of reactive functional groups: 2, molecular weight between crosslinks: 152.

<Other Active Energy Beam-Curable Compounds>
(9) Trifunctional monomer (TMPTA, trimethylolpropane triacrylate): ARONIX M-309, manufactured by Toagosei Co., Ltd., average molecular weight: 296, number of reactive functional groups: 3, molecular weight between crosslinks: 99.
(10) Hexafunctional monomer (DPHA, dipentaerythritol hexaacrylate): KAYARAD DPHA, manufactured by Nippon Kayaku Co., Ltd., average molecular weight: 578, number of reactive functional groups: 6, molecular weight between crosslinks: 96.

<Silica Particles having No (Meth)Acryloyl Groups>
(11) Other silica particles: SNOWTEX 20, manufactured by Nissan Chemical Industries, Ltd.

[Other Components]
(12) Photopolymerization initiator: IRGACURE 184, manufactured by Ciba Specialty Chemicals Inc.
(13) Ultraviolet absorber: TINUVIN 327, manufactured by Ciba Specialty Chemicals Inc.

Example 1

The components listed in Table 1 were mixed using the solid fraction ratios (mass ratios) shown in Table 1, thus preparing a liquid coating composition.

Subsequently, the obtained coating composition was spray coated onto a polycarbonate resin substrate (100×100×3 mm) using a spray gun, in an amount sufficient to generate a film thickness following curing of 10 μm. The solvent was then removed by drying in a hot-air drying oven for 3 minutes at 60° C., and the coated substrate was then irradiated with ultraviolet radiation of 500 mJ (as measured by a UVR-N1 device manufactured by Japan Storage Battery Co., Ltd.) for 2 to 3 minutes using a high-pressure mercury lamp, thereby forming a coating film, and completing preparation of a formed body composed of the substrate and the coating film. This formed body was used as a test piece.

<Evaluations>

Test pieces prepared in the manner described above were evaluated for adhesion of the coating film to the polycarbonate resin substrate, and the abrasion resistance and weather resistance of the test piece, under the conditions described below. The results of these evaluations are shown in Table 1.

(Evaluation of Initial Adhesion)

A cutter was used to form cross-cuts of width 1 mm in the test piece to form a 10×10 grid of squares in the test piece coating film. A tape was affixed to the grid squares and then peeled away, and the adhesion was evaluated on the basis of the evaluation criteria outlined below. Cellophane tape (a registered trademark) was used as the tape.

O: absolutely no peeling of the coating film
Δ: some peeling at the corners of the coating film grid squares
x: one or more coating film grid squares was removed (Evaluation of Moisture-Resistant Adhesion)

A test piece was left to stand for 240 hours in an atmosphere at a temperature of 50° C. and a humidity of 95%, and a cutter was then used to form cross-cuts of width 1 mm in the test piece to form a 10×10 grid of squares in the test piece coating film. A tape was affixed to the grid squares and then peeled away, and the moisture-resistant adhesion was evaluated on the basis of the evaluation criteria outlined below. Cellophane tape (a registered trademark) was used as the tape.

O: absolutely no peeling of the coating film
Δ: some peeling at the corners of the coating film grid squares
x: one or more coating film grid squares was removed (Evaluation of Heat-Resistant Adhesion)

A test piece was left to stand for 240 hours in an atmosphere at a temperature of 120° C., and a cutter was then used to form cross-cuts of width 1 mm in the test piece to form a 10×10 grid of squares in the test piece coating film. A tape was affixed to the grid squares and then peeled away, and the heat-resistant adhesion was evaluated on the basis of the evaluation criteria outlined below. Cellophane tape (a registered trademark) was used as the tape.

O: absolutely no peeling of the coating film

Δ: some peeling at the corners of the coating film grid squares x: one or more coating film grid squares was removed (Evaluation of Adhesion Following Cold-Hot Temperature Cycling)

A test piece was subjected to a total of 50 cycles of a cold-hot cycle, wherein each cycle consisted of holding the test piece for 2 hours at −40° C. and then for 2 hours at 80° C. A cutter was then used to form cross-cuts of width 1 mm in the test piece to form a 10×10 grid of squares in the test piece coating film. A tape was affixed to the grid squares and then peeled away, and the adhesion was evaluated on the basis of the evaluation criteria outlined below. Cellophane tape (a registered trademark) was used as the tape.

O: absolutely no peeling of the coating film

Δ: some peeling at the corners of the coating film grid squares x: one or more coating film grid squares was removed (Evaluation of Abrasion Resistance)

A test piece was mounted in a Taber Abrasion Tester AB 101 (manufactured by Tester Sangyo Co., Ltd.), and an abrasive wheel CF-10F (manufactured by Taber Industries) was used to apply a loading of 500 g for 1,000 revolutions. A haze meter MH-150 (manufactured by Murakami Color Research Laboratory Co., Ltd.) was then used to measure the haze value of the test piece. The abrasion resistance was evaluated on the basis of this haze value, using the evaluation criteria outlined below.

OO: a haze value of less than 10

O: a haze value of at least 10 but less than 20

Δ: a haze value of at least 20 but less than 30 x: a haze value of 30 or greater (Evaluation of Weather Resistance)

A test piece was placed inside an accelerated weather resistance test instrument "SUNSHINE WEATHEROMETER WEL-SUN-DC-B" (manufactured by Suga Test Instruments Co., Ltd.), and the coating film was subjected to an accelerated degradation test under conditions including an artificial sunlight irradiation time of 3,000 hours, a water spray time of 600 hours during this 3,000-hour irradiation period, and a temperature of 63° C.

The external appearance of the test piece following completion of the accelerated degradation weathering test was inspected visually and evaluated using the evaluation criteria outlined below.

O: no abnormalities such as yellowing were visible on the coating film or the polycarbonate resin substrate Δ: abnormalities such as whitening or yellowing were visible at the edges of the test piece coating film.

x: abnormalities such as yellowing were visible across the entire coating film and/or on the polycarbonate resin substrate.

Examples 2 to 8

The components listed in Table 1 were mixed using the solid fraction ratios (mass ratios) shown in Table 1, thus preparing a series of liquid coating compositions. With the exception of using the thus obtained coating compositions, test pieces were prepared and evaluated in the same manner as that described for example 1. The results are shown in Table 1.

Comparative Examples 1 to 7

The components listed in Table 2 were mixed using the solid fraction ratios (mass ratios) shown in Table 2, thus preparing a series of liquid coating compositions. With the exception of using the thus obtained coating compositions, test pieces were prepared and evaluated in the same manner as that described for example 1. The results are shown in Table 2.

TABLE 1

| | | | Example | | | | | | | |
|---|---|---|---|---|---|---|---|---|---|---|
| | | | 1 | 2 | 3 | 4 | 5 | 6 | 7 | 8 |
| Coating film-forming components | Polymerizable silica particles | BEAMSET HC-900 | 10 | 10 | 1 | 5 | 15 | 20 | 40 | 10 |
| | Aliphatic urethane (meth)acrylate | Nonfunctional oligomer | 40 | | 49 | 45 | 35 | 60 | 20 | |
| | | Hexafunctional oligomer | | 40 | | | | | | 40 |
| | Active energy beam-curable compound | Alicyclic oligomer (difunctional) | | | | | | 20 | | 20 |
| | | Alicyclic monomer (difunctional) | 20 | 20 | 20 | 20 | | 10 | | 20 |
| | Other active energy beam-curable compound | Trifunctional monomer | 30 | | 30 | 30 | 30 | 10 | 20 | |
| | | Hexafunctional monomer | | 30 | | | | | | 25 |
| | Other silica particles | SNOWTEX 20 | | | | | | | | 5 |
| Other components | Photopolymerization initiator | IRGACURE 184 | 5 | 5 | 5 | 5 | 5 | 5 | 5 | 5 |
| | Ultraviolet absorber | TINUVIN 327 | 5 | 5 | 5 | 5 | 5 | 5 | 5 | 5 |
| | Solvent | Butyl acetate | 100 | 100 | 100 | 100 | 100 | 100 | 100 | 100 |
| Amount within coating film-forming components (mass%) | Polymerizable silica particles | | 10 | 10 | 1 | 5 | 15 | 20 | 40 | 10 |
| | Hexafunctional or higher aliphatic urethane (meth)acrylate | | 40 | 40 | 49 | 45 | 35 | 60 | 20 | 40 |
| | Active energy beam-curable compound having alicyclic structure | | 20 | 20 | 20 | 20 | 20 | 10 | 20 | 20 |
| Average molecular weight between crosslinks for coating film-forming components | | | 264 | 140 | 280 | 274 | 305 | 364 | 304 | 143 |

TABLE 1-continued

|  |  |  | Example | | | | | | | |
|---|---|---|---|---|---|---|---|---|---|---|
|  |  |  | 1 | 2 | 3 | 4 | 5 | 6 | 7 | 8 |
| Evaluations | Adhesion | Initial adhesion | ○ | ○ | ○ | ○ | ○ | ○ | ○ | ○ |
|  |  | Moisture-resistant adhesion | ○ | ○ | ○ | ○ | ○ | ○ | ○ | ○ |
|  |  | Heat-resistant adhesion | ○ | ○ | ○ | ○ | ○ | ○ | ○ | ○ |
|  |  | Adhesion following cold-hot temperature cycling | ○ | ○ | ○ | ○ | ○ | ○ | ○ | ○ |
|  | Abrasion resistance |  | ○○ | ○○ | ○ | ○ | ○○ | ○○ | ○○ | ○○ |
|  | Weather resistance |  | ○ | ○ | ○ | ○ | ○ | ○ | ○ | ○ |

TABLE 2

|  |  |  | Comparative Example | | | | | | |
|---|---|---|---|---|---|---|---|---|---|
|  |  |  | 1 | 2 | 3 | 4 | 5 | 6 | 7 |
| Coating film-forming components | Polymerizable silica particles | BEAMSET HC-900 | 0.5 | 10 | 10 | 10 | 50 | 10 | 10 |
|  | Aliphatic urethane (meth)acrylate | Nonafunctional oligomer | 50 |  |  |  | 30 | 40 |  |
|  |  | Hexafunctional oligomer |  |  |  |  |  |  |  |
|  |  | Tetrafunctional oligomer |  | 40 |  |  |  |  |  |
|  |  | Difunctional oligomer |  |  | 40 |  |  |  |  |
|  | Aromatic urethane (meth)acrylate | Hexafunctional oligomer |  |  |  |  |  |  | 40 |
|  | Active energy beam-curable compound | Alicyclic oligomer (difunctional) |  |  |  | 40 |  |  |  |
|  |  | Alicyclic monomer (difunctional) | 20 | 20 | 20 | 20 | 10 |  | 20 |
|  | Other active energy beam-curable compound | Trifunctional monomer | 29.5 | 30 | 30 | 30 | 10 | 50 |  |
|  |  | Hexafunctional monomer |  |  |  |  |  |  | 30 |
| Other components | Photopolymerization initiator | IRGACURE | 5 | 5 | 5 | 5 | 5 | 5 | 5 |
|  | Ultra absorber | TINUVIN 327 | 5 | 5 | 5 | 5 | 5 | 5 | 5 |
|  | Solvent | Butyl acetate | 100 | 75 | 75 | 75 | 100 | 100 | 100 |
| Amount within coating film-forming components (mass %) | Polymerizable silica particles |  | 0.5 | 10 | 10 | 10 | 50 | 10 | 10 |
|  | Hexafunctional or higher aliphatic urethane (meth)acrylate |  | 50 | 0 | 0 | 0 | 30 | 10 | 0 |
|  | Active energy beam-curable compound having alicyclic structure |  | 20 | 20 | 20 | 60 | 10 | 0 | 20 |
| Average molecular weight between crosslinks for coating film-forming components |  |  | 283 | 133 | 3178 | 231 | 316 | 252 | 140 |
| Evaluations | Adhesion | Initial adhesion | ○ | ○ | ○ | ○ | ○ | ○ | ○ |
|  |  | Moisture-resistance adhesion | ○ | ○ | ○ | ○ | ○ | ○ | ○ |
|  |  | Heat-resistant adheasion | ○ | ○ | ○ | ○ | ○ | ○ | ○ |
|  |  | Adhesion following cold-hot temperature cycling | ○ | ○ | ○ | × | × | × | ○ |
|  | Abrasion resistance |  | △ | △ | × | ○ | ○○ | ○○ | ○○ |
|  | Weather resistance |  | ○ | ○ | × | × | × | △ | × |

As is evident from Table 1, the coating compositions obtained in the examples were able to form coating films that exhibited favorable adhesion to the polycarbonate resin substrate, as well as excellent levels of abrasion resistance and weather resistance. However, in the case of examples 3 and 4, in which the amount of the polymerizable silica particles was within a range from 1 to 5 mass %, the abrasion resistance was inferior to that of the other examples.

On the other hand, as is evident from Table 2, the coating films formed using the coating compositions obtained in the comparative examples were unable to satisfy all three properties of favorable adhesion to the polycarbonate resin substrate as well as superior abrasion resistance and weather resistance.

In the case of comparative example 1, because the amount of the polymerizable silica particles was very small, the abrasion resistance of the coating film deteriorated. In contrast, in the case of comparative example 5, the amount of the polymerizable silica particles was very large, and therefore although the abrasion resistance of the coating film was good, the adhesion of the coating film to the polycarbonate resin substrate, and particularly the adhesion following cold-hot temperature cycling, was poor. Further, the weather resistance also worsened, and cracks appeared in the coating film.

In the case of comparative examples 2 and 3, the number of functional groups within the aliphatic urethane (meth)acrylate was 2 or 4 respectively, and therefore the abrasion resistance of the coating film deteriorated. Particularly in comparative example 3, which used a difunctional aliphatic urethane(meth)acrylate, the weather resistance also deteriorated, and the film suffered from whitening.

In the case of comparative example 4, because a hexafunctional or higher aliphatic urethane(meth)acrylate was not used, the adhesion following cold-hot temperature cycling was poor. Further, the weather resistance also deteriorated, and the film suffered from whitening.

In the case of comparative example 6, because an active energy beam-curable compound having an alicyclic structure was not used, the adhesion, and particularly the adhesion following cold-hot temperature cycling, was poor. Further, the weather resistance also deteriorated, and the film suffered from whitening.

In the case of comparative example 7, an aromatic urethane (meth)acrylate was used instead of the hexafunctional or higher aliphatic urethane(meth)acrylate, and as a result, the weather resistance deteriorated and the coating film suffered from yellowing.

INDUSTRIAL APPLICABILITY

The present invention enables the formation of a coating film that exhibits favorable adhesion to plastic substrates, as well as excellent abrasion resistance and weather resistance. A formed body coated with such a coating film exhibits excellent abrasion resistance and weather resistance.

The invention claimed is:

1. A composition for coating a plastic substrate, said composition comprising, as coating film-forming components;
    silica particles having (meth)acryloyl groups;
    a hexafunctional or higher aliphatic urethane (meth)acrylate; and
    urethane (meth)acrylates having an alicyclic structure as an active energy beam-curable compound having an alicyclic structure;
    wherein an amount of said silica particles having (meth)acryloyl groups is within a range of 1.0 to 40 mass %, relative to 100 mass % of said coating film-forming components, an average particle size of said silica particles having (meth)acryloyl groups is within a range of 5 to 600 nm, and said composition for coating a plastic substrate does not contain aromatic urethane (meth)acrylates.

2. The composition for coating a plastic substrate according to claim 1, wherein an amount of said aliphatic urethane (meth) acrylate is within a range of 10 to 60 mass %, relative to 100 mass % of said coating film-forming components.

3. The composition for coating a plastic substrate according to claim 1, wherein an amount of said active energy beam-curable compound is within a range of 5 to 60 mass %, relative to 100 mass % of said coating film-forming components.

4. The composition for coating a plastic substrate according to claim 1, further comprising 1 to 20 parts by mass of a photopolymerization initiator relative to 100 parts by mass of said coating film-forming components.

5. The composition for coating a plastic substrate according to claim 1, wherein the average particle size of said silica particles having (meth)acryloyl groups is within a range of 10 to 300 nm.

6. The composition for coating a plastic substrate according to claim 1, wherein the average particle size of said silica particles having (meth)acryloyl groups is within a range of 10 to 200 nm.

7. A coating film, formed from the composition for coating a plastic substrate according to claim 1.

8. A formed body, comprising a plastic substrate and a coating film according to claim 7 coated thereon.

* * * * *